United States Patent [19]

Perez et al.

[11] Patent Number: 4,786,682
[45] Date of Patent: Nov. 22, 1988

[54] COATING COMPOSITIONS PREPARED FROM MICHAEL ADDUCTS

[75] Inventors: Leon A. Perez, Pittsburgh; H. Hayne Crum, III, Gibsonia, both of Pa.

[73] Assignee: PPG Industries, Inc., Pittsburgh, Pa.

[21] Appl. No.: 66,388

[22] Filed: Jun. 25, 1987

[51] Int. Cl.$^4$ .............................................. C08G 18/30
[52] U.S. Cl. ......................................... 525/28; 525/30; 525/123; 525/124; 525/127; 525/455; 528/45; 528/48; 528/53; 528/64; 528/66; 528/75
[58] Field of Search ....................... 528/45, 48, 53, 64, 528/66, 75; 525/28, 30, 455, 123, 124, 127

[56] References Cited

U.S. PATENT DOCUMENTS

| | | | |
|---|---|---|---|
| 3,953,391 | 4/1976 | Dowbenko et al. | 260/29.6 TA |
| 4,198,331 | 4/1980 | Buchwalter et al. | 260/29.2 EP |
| 4,248,753 | 2/1981 | Buchwalter et al. | 260/29.2 TN |
| 4,256,560 | 3/1981 | Buchwalter et al. | 204/181 C |
| 4,284,544 | 8/1981 | Wegner et al. | 260/29.2 |
| 4,316,784 | 2/1982 | Buchwalter et al. | 204/181 C |
| 4,330,640 | 5/1982 | Buchwalter | 524/555 |
| 4,341,676 | 7/1982 | Patricca et al. | 523/417 |
| 4,387,181 | 6/1983 | Brown et al. | 524/714 |
| 4,414,068 | 11/1983 | Patricca et al. | 204/181 |
| 4,430,474 | 2/1984 | Schnurbusch et al. | 524/590 |
| 4,504,630 | 3/1985 | Buchwalter | 525/296 |
| 4,518,522 | 5/1985 | Markusch et al. | 252/188.31 |
| 4,624,996 | 11/1986 | Rizk et al. | 525/453 |
| 4,647,646 | 3/1987 | Hardy et al. | 528/45 |

*Primary Examiner*—John Kight
*Assistant Examiner*—S. A. Acquah
*Attorney, Agent, or Firm*—Linda Pingitore

[57] ABSTRACT

A coating composition contains;

A. an ungelled Michael adduct formed by reacting, under conditions sufficient to form a Michael adduct,
   (a) a material containing one or more primary and/or secondary amino groups and at least two hydroxyl groups;
   (b) a material containing at least two alpha,beta-ethylenically unsaturated moieties; with the proviso that the reactants (a) and (b) are selected such that the resultant Michael adduct contains hydroxyl functionality; and
B. a curing agent adapted to crosslink with the hydroxyl functionality present on the Michael adduct; said adduct being stable under the curing conditions for the coating composition.

The aforedescribed coating compositions are particularly useful as anti-chip primers.

15 Claims, No Drawings

COATING COMPOSITIONS PREPARED FROM MICHAEL ADDUCTS

BACKGROUND OF THE INVENTION

The present invention relates to coating compositions prepared from Michael adducts.

The formulation of coating compositions using Michael addition products has been detailed in a number of references. U.S. Pat. No. 4,248,753 to Buchwalter et al relates to curable compositions in which the resinous binder is the Michael adduct of a primary and/or secondary amine and a polymeric material containing alpha,beta-ethylenically unsaturated moieties in conjugation with carbonyl moieties. The preferred Michael adducts prepared in accordance with the Buchwalter et al reference also contain active hydrogens which are reactive at elevated temperatures with a curing agent. The Michael adducts of the Buchwalter et al reference, however, are unstable adducts. That is, the Michael adduct decomposes under curing conditions releasing free amine which volatilizes.

U.S. Pat. No. 4,341,676 to Patricca et al relates to resinous compositions which are prepared by reacting an N-methylol ethylenically unsaturated amide with a polymer which contains a mercapto and/or a pendant amino group which is a primary and/or secondary amine, or the mixture of the aforesaid polymers. It is theorized in the reference that the reaction mechanism involved in the preparation of the compositions is that of a Michael addition. The polymer, through the pendant amino or mercapto groups, adds to the N-methylol ethylenically unsaturated amide at the site of unsaturation, thereby forming the compositions of the invention. There is no disclosure in the Patricca et al reference of the use of materials containing more than one alpha,beta-ethylenically unsaturated moiety. The disclosure is solely directed to N-methylol ethylenically unsaturated amides.

U.S. Pat. No. 4,330,640 to Buchwalter relates to amide adduct resinous compositions prepared from polymers having pendant unsaturated groups. The resinous compositions are prepared by aminating the polymers containing the unsaturated groups at the ethylenically unsaturated position, with ammonia or a primary or secondary amine which may be volatile or non-volatile. The Michael adducts of the Buchwalter reference are also unstable under curing conditions. That is, they decompose and the amine is volatilized.

The formulation of coating compositions from Michael addition products which contain hydroxyl functionality, are stable under curing conditions of less than 300° F. (149° C.) for 20 to 30 minutes, and which have been prepared from a material containing two or more ethylenically unsaturated moieties and a material which contains one or more primary and/or secondary amino groups has been unknown, heretofore.

SUMMARY OF THE INVENTION

In accordance with the present invention, there is provided a coating composition, comprising:
A. an ungelled Michael adduct formed by reacting, under conditions sufficient to form a Michael adduct,
  (a) a material containing one or more primary and/or secondary amino groups and at least two hydroxyl groups; with
  (b) a material containing at least two alpha,beta-ethylenically unsaturated moieties; with the proviso that the reactants (a) and (b) are selected such that the resultant Michael adduct contains hydroxyl functionality; and
B. a curing agent adapted to crosslink with the hydroxyl functionality present on the Michael adduct, said adduct being stable under the curing conditions for the coating composition.

DETAILED DESCRIPTION OF THE INVENTION

The coating compositions of the present invention are comprised of two principle constituents. The first component is an ungelled Michael adduct formed by reacting, under conditions sufficient to form a Michael adduct, a material containing one or more primary and/or secondary amino groups with a material containing at least two alpha,beta-ethylenically unsaturated moieties. It should be understood that the materials of (a) and (b) are selected such that the resultant Michael adduct contains hydroxyl functionality. Therefore, either the material containing amino groups or the material containing unsaturated moieties or both of these materials can contain hydroxyl groups.

In one preferred embodiment the material containing one or more primary and/or secondary amino groups additionally contains one or more hydroxyl groups, preferably at least two hydroxyl groups. A preferred group of such materials is the dialkanolamines such as diethanolamine, diisopropanolamine, diisobutanolamine or dihexanolamine. The preferred dialkanolamine is diethanolamine.

Other suitable amine group containing materials include diethylenetriamine, triethylenetetramine, tetraethylenepentamine, tris (2-aminoethyl)amine which is commerically available from W. R. Grace Company as TREN and various polyoxyalkylene amines which are commerically available from Texaco under the trademark JEFFAMINE. In accordance with the proviso given above, since these materials do not contain hydroxyl functionality they should be utilized in conjunction with an ethylenically unsaturated material which also contains hydroxyl groups in forming the Michael adduct.

It should be noted that it is permissible for the material containing one or more primary and/or secondary amino groups to be polymeric so long as it is selected such that the resultant Michael adduct is ungelled. By "ungelled" is meant that the Michael adduct is fluid in nature and essentially free of any crosslinked particles. It should be noted that mixtures of the aforedescribed amines can be utilized if desired.

The material containing at least two alpha,beta-ethylenically unsaturated moieties also can be selected from a variety of materials which are capable of participating in a Michael addition reaction. The ethylenically unsaturated materials which readily undergo Michael addition are those in which the unsaturation site is activated by an electron withdrawing group in a beta position to the site of unsaturation. Such activating groups include ketones, sulfones, esters, cyanides, amides, phosphonate esters and electron deficient aromatic systems. For a detailed discussion of Michael addition see House, *Modern Synthetic Reactions,* second edition, W. A. Benjamin, Inc., copyright 1972, pages 595 to 623. The preferred ethylenically unsaturated materials are acrylate functional. As was noted above, the material containing the unsaturated moieties can contain hydroxyl groups either in addition to or instead of the amine containing material. These materials are described in detail below. It should be noted that mixtures of the various ethylenically unsaturated materials can be utilized if desired.

Suitable acrylate functional materials are exemplified by several polyol polyacrylates. These examples are simply illustrative and are not intended to be limiting. Representative examples include hydrocarbonpolyol polyacrylates, saturated polyesterpolyol polyacrylates, urethanepolyol polyacrylates, polyurethanepolyol polyacrylates, etherpolyol polyacrylates, and polyetherpolyol polyacrylates. As was noted above these materials can be prepared so that they contain hydroxyl groups or are free of hydroxyl groups. In any event they must contain at least two alpha,beta-ethylenically unsaturated moieties.

Hydrocarbon polyol polyacrylates can be derived from the reaction of an acrylic acid with a polyhydric material. Polyhydric materials include the aliphatic diols such as ethylene glycol, 1,2-propanediol, 1,3-propanediol, 2,2,4-trimethyl-1,3-pentanediol, 2,2-dimethyl-1,3-propanediol, 1,2-butanediol, 1,4-butanediol, 1,3-butanediol, 1,5-pentanediol, 1,6-hexanediol, 1,10-decanediol, 2,2-dimethyl-3-hydroxypropyl 2,2-dimethyl-3-hydroxypropionate, and ester diols formed from one mole of a diol and at least one mole of a lactone, e.g., butyrolactone or caprolactone; diols containing a cyclic structure such as 1,4-cyclohexanedimethanol, p-xylylene glycol, bisphenol A, hydrogenated bisphenol A, and 1,4-cyclohexane diol, triols such as glycerol, trimethylol ethane, trimethylol propane, and 1,2,6-hexane triol; and tetraols such as pentaerythritol. The diols are the preferred polyhydric materials. Preferably 1,6-hexanediol is utilized. In order to prepare the aforedescribed unsaturated materials which are free of hydroxyl groups the aforementioned acrylic acid is reacted with the polyhydric material in an essentially equivalent ratio or a slight excess so as to produce a material of the formula:

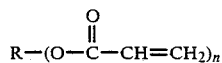

where R is the residue of the polyhydric material and n is at least 2. If it is desired to prepare these materials to contain hydroxyl groups the polyhydric material(s) should be selected such that the average hydroxyl functionality is greater than two and in addition, the polyhydric material(s) should be used in excess of the acrylic acid.

Saturated polyesterpolyol polyacrylates can be derived from the reaction of a dicarboxylic acid with a polyhydric material which is further reacted with an acrylic acid. Suitable saturated dicarboxylic acids (which for purposes herein are defined to include those dicarboxylic acids where the only unsaturation occurs in the aromatic nuclei) useful in this reaction are adipic acid, sebacic acid, succinic acid, phthalic acid, isophthalic acid and azelaic acid. Unsaturated dicarboxylic acid such as maleic acid, fumaric acid, citraconic acid, and itaconic acid can be used, but only in minor components. Anhydrides of the aforementioned acids, where they exist, are intended to be embraced by the term "acid." Suitable polyhydric materials are described above. As has been discussed above, if it is desired to prepare these materials such that they contain hydroxyl groups the polyhydric material(s) should be selected such that the average hydroxyl functionality is greater than two and in addition, the polyhydric material(s) should be used in excess of the acrylic acid.

Saturated polyesterpolyol polyacrylates can also be derived from the reaction of a hydroxyalkyl acrylate with lactones. Such adducts or the hydroxyalkyl acrylates, per se, can then be reacted with an equivalent amount of dicarboxylic acid to give a polyester diacrylate. Hydroxyalkyl acrylates wherein the alkyl group contains from 2 to 10 carbon atoms are preferred with examples thereof being 2-hydroxyethyl acrylate, 2-hydroxypropyl acrylate, 3-hydroxypropyl acrylate, 2-hydroxybutyl acrylate, and 6-hydroxynonyl acrylate. Lactones are exemplified by epsilon-caprolactone, epsilon-methylcaprolactone, and butyrolactone. The adducts which have been described contain two ethylenically unsaturated groups and do not contain hydroxyl groups. If desired these adducts can be modified to contain hydroxyl groups by methods well known to those skilled in the art.

Urethanepolyol polyacrylates are derived from the reaction of an isocyanate with a hydroxyalkyl acrylate. The isocyanate is a polyisocyanate. Several different polyisocyanates are useful. Examples include aliphatic, cycloaliphatic or aromatic compounds having two or more isocyanate groups. Illustrative compounds are 1,4-tetramethylene diisocyanate; 1,6-hexamethylene diisocyanate, 2,2,4-trimethyl-1,6-diisocyanato hexane, 1,10-decamethylene diisocyanate; 1,4-cyclohexylene diisocyanate; 4,4'-methylene bis-(isocyanato cyclohexane); p-phenylene diisocyanate; isophorone diisocyanate; 4,4'-bisphenylene diisocyanate; 4,4'-methylene bis(diphenyl isocyanate); 1,5-naphthalene diisocyanate; and 1,5-tetrahydronaphthalene diisocyanate. Examples of hydroxyalkyl acrylate compounds reacted with the isocyanate include 2-hydroxyethyl acrylate, 2-hydroxypropyl acrylate, 3-hydroxypropyl acrylate, trimethylolpropane mono-and-diacrylate, and any of the aforedescribed acrylates which has been modified by reaction with a lactone. When equivalent amounts of the hydroxyalkyl acrylates and isocyanates reactants are used the resultant unsaturated material is free of hydroxyl groups. If it is desired to prepare these materials to contain hydroxyl groups, for example, the polyisocyanate can be selected such that it contains hydroxyl groups or contains groups capable of being modified to form hydroxyl groups.

Etherpolyol polyacrylates which are useful can be made by different methods. One method involves reacting an ether-containing polyol with acrylic acid. The ether polyol can be diethylene glycol, dipropylene glycol, dibutylene glycol or can be made by reacting a suitable polyhydric material as described above with a monoepoxide such as butyl glycidyl ether, octyl glycidyl ether, allyl glycidyl ether, phenyl glycidyl ether, 1,2-butylene oxide, and styrene oxide. If it is desired to prepare these materials to contain hydroxyl groups the polyhydric material(s) should be selected such that the average hydroxyl functionality is greater than two and in addition, the polyhydric material(s) should be used in excess of the acrylic acid.

Etherpolyol polyacrylates can also be derived from the reaction of (1) an acrylic acid with (2) a polyglycidyl ether of a polyphenol or polyhydric alcohol. Any polyglycidyl ether of a polyphenol or a polyhydric material can be used. Preferred are the polyglycidyl ethers of a polyphenol such as bisphenol A. Other polyglycidyl ethers are obtained by etherification of a polyphenol with epichlorohydrin or dichlorohydrin in the presence of an alkali. The phenolic compound can be 2,2-bis(4-hydroxyphenyl)propane; 4,4'-dihydroxybenzophenone; 1,1-bis(4-hydroxyphenyl)ethane; and 1,5-dihydroxynaphthalene. Similar polyglycidyl ethers of polyhydric alcohols are derived from such polyhydric alcohols as ethylene glycol, diethylene glycol, triethylene glycol, 1,2-propylene glycol, 1,4-butylene glycol, 1,5-pentanediol and trimethylolpropane. When equivalent amounts of the acrylic acid and polyglycidyl ethers are used the resultant unsaturated material is free of hydroxyl groups. If it is desired to prepare these materials to contain hydroxyl groups the polyhydric material(s) should be selected such that the average hydroxyl functionality is greater than two and in addition, the polyhydric material(s) should be used in excess of the acrylic acid.

As was mentioned above, the ungelled Michael adduct which contains hydroxyl functionality is prepared by reacting a material containing one or more primary and/or secondary amino groups with a material containing at least two alpha,beta-ethylenically unsaturated moieties under conditions sufficient to form a Michael adduct. By "conditions sufficient to form a Michael adduct" is meant that the unsaturated moieties are sufficiently active to undergo Michael addition with the amine containing material. An ungelled Michael adduct according to the present invention can be prepared, for example, in the following manner. To a stirred mixture of the material containing at least two ethylenically unsaturated moieties and if desired a suitable solvent to reduce viscosity, the amine containing material is added. The reaction temperature can be initially ambient temperature or slightly above ambient. Cooling may or may not be necessary depending upon the exothermic nature of the particular reaction and the scale on which it is conducted. Following amine addition, reaction is carried to completion by heating at a temperature ranging from about 50° C. to about 80° C. for a period of from 1 to about 15 hours. The extent of completion of the reaction can be monitored by infrared spectroscopy and/or by monitoring the tertiary amine equivalent weight.

Secondary amines are preferred to primary amines because of better ease of processing. Primary amines are difunctional with respect to alpha,beta-ethylenically unsaturated moieties, e.g., acrylates, in a Michael addition reaction and therefore have potential for gelling the reaction mixture. If primary amines are used, precautions should be taken to avoid gelling. For example, an excess amount of a primary monoamine can be utilized.

The equivalent ratio of amine to unsaturated material can range from about 1.5:1.0 to about 1.0:1.0, preferably 1.2:1.0 to 1.0:1.0 and more preferably 1.1:1.0 to 1.0:1.0.

As has been mentioned previously in the specification, the Michael adducts prepared according to the present invention are ungelled. By "ungelled" is meant that the adducts are fluid in nature and essentially free of any crosslinked particles.

The ungelled Michael adducts prepared in accordance with the present invention must contain hydroxyl functionality which can be derived either from the material containing one or more primary and/or secondary amino groups or the material containing ethylenic unsaturation or both materials. Other active hydrogens may be present on the Michael adduct depending upon the particular amine containing material and unsaturated material selected.

The hydroxyl groups present on the Michael adduct are capable of reacting with the curing agent of the coating composition to form a crosslinked film. The curing agent is adapted to crosslink with the hydroxyl groups and any other active hydrogen groups present on the Michael adduct.

If desired, mixtures of Michael adducts can be utilized.

Examples of suitable curing agents are aminoplast resins, phenolic resins and polyisocyanates. It should be noted that the reaction of aminoplast or phenoplast crosslinking agent with hydroxyl groups is generally acid catalyzed; therefore, an excess amount of acid catalyst is preferably utilized in these coating compositions to counter the basicity contributed by the tertiary amine nitrogens from the Michael adduct. In addition to aminoplast resins, phenolic resins and polyisocyanates, the Michael adducts of the present invention are also readily coreactive with epoxide and anhydride functionality. It is believed that the tertiary amine nitrogens of the Michael adduct facilitate the reaction between hydroxyl and epoxide, which is normally slow.

If desired, mixtures of the aforesaid curing agents can be used.

A polyisocyanate is preferably used as a curing agent and preferably the polyisocyanate is blocked or capped so that it will not prematurely react with the hydroxyls on the Michael adduct. When the polyisocyanate is blocked, one package, stable coating compositions can be achieved which have a excellent shelf life. Of course, if an unblocked polyisocyanate is used a two package coating composition can be prepared with the Michael adduct in one package and the free polyisocyanate in a second package. Other components can be added to either package as desired. These curing agents are discussed in detail below.

The aminoplasts are aldehyde condensation products of melamine, benzoguanamine, urea or similar compounds. Generally, the aldehyde employed is formaldehyde, although useful products can be made from other aldehydes such as acetaldehyde, crotonaldehyde, acrolein, benzaldehyde, furfural and others. Condensation products of melamine, urea or benzoguanamine are most common and are preferred but products of other amines and amides in which at least one amino group is present can also be employed. For example, such condensation products can be produced from various diazines, triazoles, guanidines, guanamines and alkyl and di-substituted derivatives of such compounds including alkyl and aryl-substituted ureas and alkyl and aryl-substituted melamines and benzoguanamines. Examples of such compounds are N,N-dimethyl urea, N-phenyl urea, dicyandiamine, formoguanamine, acetoguanamine, 6-methyl-2,4-diamino,1,3,5-triazine, 3,5-diaminotriazole, triaminopyrimidine, 2,4,6-triethyltriamine-1,3,5-triazine and the like.

These amine-aldehyde condensation products contain methylol groups or similar alkylol groups depending upon the particular aldehyde employed. If desired, these methylol groups can be etherified by reaction with an alcohol. Various alcohols are employed for this purpose including essentially any monohydric alcohol, although the preferred alcohols contain from 1 to 4 carbon atoms such as methanol, ethanol, isopropanol and n-butanol.

The phenolic resins commonly referred to as phenoplasts are obtained by the condensation of phenol or alkyl substituted phenols with aldehydes. The monohydric phenols such as phenol, cresol and xylenol are the most typically utilized since they are readily available and relatively inexpensive. Phenol is the typically preferred monohydric phenol. Polyhydric phenols such as resorcinol can also be use herein. Formaldehyde is the preferred aldehyde used in the production of the phenolic resins. Other aldehydes which are also useful include acetaldehyde, butyraldehyde and furfuraldehyde. The preferred phenolic resin is produced by the condensation of phenol and formaldehyde.

The capped or blocked isocyanates which can be employed in the compositions of the present invention can be any isocyanate where the isocyanato groups have been reacted with a compound so that the resultant capped isocyanate is stable to active hydrogens at room temperature, that is, 20° to 30° C., but reactive with active hydrogens at elevated temperatures, usualy between about 90° C. and about 200° C.

In the preparation of the capped organic polyisocyanate, any suitable organic polyisocyanate including aliphatic, cycloaliphatic and aromatic polyisocyanates may be used. Examples include tetramethylene diisocyanate, isophorone diisocyanate, 4,4'-dicyclohexyl methane diisocyanate, 2,4- or 2,6-toluene diisocyanate and mixtures thereof. Higher polyisocyanates can be employed such as triisocyanates. Preferably toluene diisocyanate is used.

In one preferred embodiment of the present invention, the blocked polyisocyanate curing agent is polymeric in nature and is prepared by reacting a polyisocyanate, preferably, diisocyanate with an active hydrogen containing material such as a polyester or polyether polyol to form an isocyanate containing prepolymer. The free isocyanate groups are subsequently blocked with a suitable blocking agent as discussed herein.

Any suitable aliphatic, cycloaliphatic, aromatic alkyl mono-alcohol or phenolic compound may be used as a capping agent in accordance with the present invention, such as, for example, lower aliphatic alcohols containing from 1 to 4 carbon atoms such as methanol and ethanol; cycloaliphatic alcohols such as cyclohexanol; aromatic alkyl alcohols such as phenyl carbinol.

Additional capping agents include oximes such as methyl ethyl ketoxime, acetophenone oxime and lactams such as epsilon-caprolactam. Use of oximes and lactams is particularly desirable because the polyisocyanates blocked with these agents unblock and react at relatively low temperatures. A particularly preferred oxime blocking agent is acetophenone oxime.

The reaction between the organic polyisocyanate and a capping agent is usually exothermic, therefore, the polyisocyanate and the capping agent are preferably admixed at temperatures of no higher than 80° C. and preferably below 50° C. to minimize the exotherm effect.

The polyisocyanate curing agent can be used in two similar ways. The polyisocyanate can be fully capped, that is, no free isocyanate groups remain, and then combined with the Michael adduct. Or, the polyisocyanate can be partially capped, for example, a half-capped diisocyanate so that reactive isocyanate groups remain. The partially capped isocyanate can then be reacted with a portion of the active hydrogens in the Michael adduct under conditions which will not unblock the isocyanate nor gel the reaction mixture. This reaction makes the capped isocyanate integral with the Michael adduct. Whether partially capped or fully capped, sufficient polyisocyanate is present in the coating system so that the equivalent ratio of latent curing capped isocyanate groups to active hydrogens is at least 0.05:1 and preferably about 1.1:1.0 to 1.0:1.0.

A very important feature of the Michael adducts of the present invention is that they are stable under the conditions for curing the claimed coating compositions. By "stable" is meant that the adduct will not substantially decompose to release free amine and/or ethylenically unsaturated material. It has been observed that the Michael adducts of the present invention typically lose less than six percent of their weight when heated under the temperature and time conditions which would be used for cure of the coating composition. It is believed that a portion of this weight loss may be due to volatilization of unreacted excess free amine from the preparation of the Michael adduct. In addition, by "stable" is meant that the adduct itself is ungelled and will not self-condense to form a crosslinked matrix. The conditions for curing the claimed coating compositions preferably involve baking at elevated temperatures ranging from about 115° C. to 150° C. for about 10 to about 60 minutes. The claimed coating compositions also can be cured at ambient temperature, for example, if the adduct is cured with an epoxide or anhydride containing material.

An important feature of preferred embodiments of the claimed invention, that is, when the amine containing material used in preparing the Michael adduct is a secondary amine, is that the resultant adduct contains tertiary amine groups which act as internal catalysts for the crosslinking reaction between the hydroxyl groups of the adduct and a polyisocyanate curing agent. It has been observed that the adducts having internal catalytic capabilities result in coating compositions which cure at lower temperatures and in a shorter time period than coating compositions which require the addition of external catalyst. It is theorized that the presence of primary hydroxyl groups on the Michael adduct contributes to the increased reactivity of the adduct. It has been observed that amine polyols which contain secondary hydroxyl groups, such as the QUADROL TM resins, generically named N,N,N',N'-tetrakis (2-hydroxypropyl)ethylene diamine, which are commercially available from BASF, exhibit a somewhat slower cure response.

The coating compositions of the present invention are typically formulated with a suitable solvent including hydrocarbons, alcohols, esters, ethers and ketones. The amount of solvent is not critical and typically ranges from about 20 percent by weight to about 35 percent by weight, the percentages based on the total weight of the composition.

The claimed coating compositions can be applied by a variety of conventional coating applications such as flow, dip, spray and roll coating to a variety of substrates such as metal, glass, wood and plastic. If desired, the coating compositions can be electrodeposited on a variety of electroconductive substrates.

The claimed coating compositions are particularly useful as anti-chip primers in automotive applications since they exhibit excellent chip resistance.

The following examples are intended to be illustrative of the invention and are not intended to be limiting.

EXAMPLE 1

| | Ungelled Michael Adduct | |
|---|---|---|
| Charge | Ingredients | Parts by Weight (grams) |
| I | diethanolamine | 9039 |
| | IONOL[1] | 1.6 |
| II | 1,6-hexanediol diacrylate | 8759 |

[1]This inhibitor is 2,6-di-tertiarybutyl paracresol and it is commercially available from Shell Chemical Company.

A suitably equipped reactor vessel also having air and nitrogen inlet tubes was charged with (I) at ambient temperature. Charge (II) was added over approximately a 7 hour time period while holding the reaction temperature below 40° C. with a water bath. The flask contents were then heated to 70° C. and held at this temperature for approximately 17 hours. The extent of reaction was monitored by infrared spectroscopy. The resultant product has a hydroxyl value of 572 and a tertiary amine equivalent of 247.9

EXAMPLE 2

| | Ungelled Michael Adduct | |
|---|---|---|
| Charge | Ingredients | Parts by Weight (grams) |
| I | trimethylolpropane triacrylate | 1776 |
| | IONOL | 0.4 |
| II | diethanolamine | 1890 |

A suitably equipped reactor vessel having air and nitrogen inlet tubes was charged with (I) at ambient temperature. Charge (II) was added dropwise over approximately a 4 hour period. The mixture was heated to about 70° C. and a sample was removed for infrared spectroscopic analysis. The reaction mixture was heated while under nitrogen atmosphere for approximately 11 hours. The extent of completion of the reaction was monitored by infrared spectroscopy. The resultant product had a total solids content of 97.41 percent, a hydroxyl value of 576.9 and a tertiary amine equivalent weight of 231.4.

EXAMPLE 3

| | Ungelled Michael Adduct | |
|---|---|---|
| Charge | Ingredients | Parts by Weight (grams) |
| I | diethanol amine | 630 |
| | N—methyl ethanolamine | 450 |
| | IONOL | 1.0 |
| | triphenylphosphite | 2.0 |
| II | 1,6-hexanediol diacrylate | 1356.0 |

A suitably equipped reactor vessel also having air and nitrogen inlet tubes was charged with (I) at ambient temperature. Charge (II) was added dropwise over approximately a 6 hour period. As a result of the reaction exotherm resulting from the addition of charge (II) the temperature during the addition rose to about 50° C. Once charge (II) was completely added the reaction mixture was heated to about 70° C. and maintained at that temperature for a period of about 7 hours. The extent of completion of the reaction was monitored by infrared spectroscopy. The resultant product had a total solids content of about 95.19 percent, a hydroxyl value of 461.6 and a tertiary amine equivalent weight of 220.2.

EXAMPLE 4

| | Ungelled Michael Adduct | |
|---|---|---|
| Charge | Ingredients | Parts by Weight (grams) |
| I | diisopropanolamine | 1330 |
| II | 1,6-hexanediol diacrylate | 1130 |

A suitably equipped reactor vessel also having air and nitrogen inlet tubes was charged with (I) at ambient temperature. Charge (II) was added over a period of approximately 1 hour and 40 minutes in conjunction with 0.2 grams of IONOL. The reaction mixture was maintained at a temperature between 60° to 70° C. for a period of approximately 9 hours. The extent of completion of the reaction was monitored by infrared spectroscopy. The resultant product had a total solids content of 95.1 percent, a hydroxyl value of 450.0 and a tertiary amine equivalent weight of 266.

EXAMPLE 5

| | Ungelled Michael Adduct | |
|---|---|---|
| Charge | Ingredients | Parts by Weight (grams) |
| I | diethanolamine | 189 |
| II | polyurethane polyol diacrylate[2] | 1339 |

[2]This polyurethane polyol diacrylate was prepared in the following manner:

| Charge | Ingredients | Parts by Weight (grams) |
|---|---|---|
| I | isophoronediisocyanate | 1111.5 |
| | dibutyltin dilaurate | 5.0 |
| II | TERATHANE 650[a] | 1625.0 |
| III | 2-hydroxyethyl acrylate | 580.0 |
| | IONOL | 3.25 |
| IV | xylene | 369.3 |
| V | butanol | 25.0 |

[a]This hydroxyl terminated polyetherpolyol is commercially available from E. I. DuPont deNemours. It has a molecular weight of 650 and a nominal hydroxyl number of about 173.

A reactor vessel equipped with thermometer, stirrer, condenser, drying tube and addition funnel was charged with (I) and heated to a temperature of 65° C. Charge (II) was added over a 1 hour period while maintaining the temperature at about 70° C. During the addition of Charge (II), as a result of the exotherm, the temperature was lowered slightly prior to the completion of the charge addition. Once the addition was completed the reaction mixture was heated to a temperature of 95° C. and held at this temperature for a one hour period. Subsequently, the reaction mixture was cooled to 65° C. and Charge (III) was added over a 45 minute period. Once again, the reaction exotherm was controlled by lowering the temperature. Once the addition was complete, Charge (IV) was added and the reaction mixture was held at 70° C. for approximately 3½ hours. Charge (IV) was then added and the reaction mixture was held for approximately one hour and 30 minutes at 68° C. The reaction mixture was then cooled and the product poured out. The resultant product had a total solids content of 89.3 percent as determined at 110° C. for one hour. The product had a Brookfield viscosity of 32,400 centipoise determined at 100 RPM using a number 7 spindle.

A suitably equipped reactor vessel also having air and nitrogen inlet tubes was charged with (I) at ambient temperature. Charge (II) was added dropwise while cooling the mixture with a cold water bath. Charge (II) was added in two portions because of a viscosity increase which was experienced at the beginning of the addition. Therefore, 126 grams of Charge (II) was added over approximately a 2 hour period. The remaining 1,213 grams were reduced to 70 percent total solids in xylene and subsequently added over approximately a 2 hour period followed by heating to 70° C. Heating was continued for approximately a 7 hour period. The resultant product had a total solids content of 75.2 percent determined at 110° C. for one hour.

EXAMPLE 6

This example illustrates the preparation of a coating composition according to the present invention in which the polyisocyanate curing agent is integral with the Michael adduct.

| Charge | Ingredients | Parts by Weight (grams) |
|---|---|---|
| I | toluene diisocyanate | 174 |
| II | acetophenone oxime[3] | 393 |
| III | Michael adduct of Example 1 | 208 |

[3]The acetophenone oxime was prepared in the following manner:

| Charge | Ingredients | Parts by Weight (grams) |
|---|---|---|
| I | acetophenone | 1502 |
|   | ethanol | 2151 |
| II | hydroxyl amine sulfate[b] | 5049 |
| III | aqueous potassium hydroxide (50%) | 898 |

[b]The hydroxyl amine sulfate was a homogenous solution of 2053 grams of hydroxyl amine sulfate in 2996 grams of deionized water. A reactor vessel equipped with metal stirrer, Vigreaux column, addition funnels, and atmospheric distillation apparatus was charged with (I) at ambient temperature. Charge (II) was added over a period of about 20 minutes followed by the addition of Charge (III). The reaction mixture was heated to reflux and allowed to reflux for approximately 6 hours. The reactor vessel was equipped for atmospheric distillation and distillation conducted for a period of approximately 7 hours. The temperature during the course of the distillation was maintained at approximately 90° C. When distillation was stopped 1690 grams of xylene were added and the heat was turned off. The contents of the reactor vessel were poured out and the layers separated using a separation funnel. The organic phase was rinsed twice with water and dried over 4 Angstrom molecular sieves.

A reactor vessel equipped with thermometer, addition funnel and nitrogen inlet tube was charged with (I) at ambient temperature. Charge (II) was added dropwise over a period of approximately 1 hour while cooling with a cold water bath. When the addition of (II) was completed the cold water bath was removed and 63 grams of n-methylpyrollinone was added. Charge (III) was added dropwise over a period of approximately 40 minutes while cooling with a cold water bath. An additional 34 grams of N-methyl pyrolidone were added to rinse the addition funnel and an additional 59 grams were added to reduce the solids to 65 percent. The resultant product has a total solids content of 85.8 percent determined at 110° C. for 1 hour.

EXAMPLE 7

This example illustrates the preparation of a coating composition according to the present invention utilizing the Michael adduct prepared in Example 4, above.

| Ingredients | Parts by Weight (grams) |
|---|---|
| pigment paste[4] | 200.0 |
| acetophenone oxime blocked polyisocyanate[5] | 58.7 |
| Michael adduct of Example 4, above | 11.5 |
| BEETLE 80[6] | 2.0 |
| ultraviolet light stabilizer[7] | 8.0 |

[4]This pigment paste was prepared in the following manner:

| Ingredients | Parts by Weight (grams) |
|---|---|
| butyl acetate | 694.0 |
| butyl carbitol acetate | 204.0 |
| silica | 80.0 |
| acetophenone oxime blocked polyisocyanate[b] | 1212.2 |
| barium sulfate | 1600.0 |
| titanium sulfate | 316.0 |
| carbon black | 4.0 |
| dibutyltin oxide | 8.0 |

[b]This acetophenone oxime blocked polyisocyanate was prepared in the following manner:

| Charge | Ingredients | Parts by Weight (grams) |
|---|---|---|
| I | toluene diisocyanate | 883.0 |
|   | N—methyl pyrrolidone | 187.0 |
| II | acetophenone oxime of footnote [3] | 1490.0 |
|   | dibutyltin dilaurate | 1.2 |
| III | TERATHANE 650 | 949.2 |
|   | 1,4-butanediol | 102.3 |
| IV | N—methyl pyrrolidone | 187.0 |

A reactor vessel equipped with thermometer, addition funnel, nitrogen inlet tube and vacuum pump for distillation was charged with (I). Charge (II) was added dropwise while cooling with a cold water bath. Charge (III) was then added over a period of about one hour and the addition funnel was rinsed with (IV). When infrared spectroscopic analysis of a sample of the product showed the absence of isocyanate the reaction mixture was vacuum distilled. The product was thinned with 63 grams of N—methyl pyrrolidone. The product had a total solids content of 69.1 percent at 110° C. for one hour. For the preparation of the paste, in a suitably equipped reactor vessel the first three ingredients above. To this mixture were added with agitation the remaining ingredients. The entire paste mixture was ground with zircoa beads to a Hegman grind of greater than 6.

[5]This acetophenone oxime blocked polyisocyanate crosslinking agent was prepared in the following manner:

| Charge | Ingredients | Parts by Weight (grams) |
|---|---|---|
| I | toluene diisocyanate | 733.0 |
|   | N—methyl pyrrolidone | 105.0 |
| II | TERATHANE 650 | 1280.0 |
|   | 1,4-butane diol | 12.8 |
| III | acetophenone oxime of footnote [3] | 1235.5 |

A reactor vessel equipped with thermometer, addition funnel, nitrogen inlet tube and vacuum pump for distillation was charged with (I). Charge (II) was added dropwise while cooling with a cold water bath. The funnel was rinsed with 185 grams of N—methyl pyrrolidone and the reaction mixture was heated to about 50° C. and Charge (III) was added while cooling with a cold water bath. When infrared spectroscopic analysis of a sample of the product showed the absence of isocyanate the reaction mixture was vacuum distilled. The product was thinned with 24 grams of xylene and 139 grams of N—methyl pyrrolidone. The product had a total solids content of 71.3 percent at 110° C. for one hour.
[6]This urea formaldehyde condensate is commercially available from American Cyanamid.
[7]This ultraviolet light stabilizer was prepared from TINUVIN 292 which is commerically available from American Cyanamid. The TINUVIN 292 was blocked with 2-ethylhexanoic acid.

The coating composition was prepared by combining the ingredients listed above with mild agitation. The coating composition had a resin solids content of 52.19 percent. The composition was spray applied onto steel panels which had been primed with a coating composition which is commerically available from PPG Industries, Inc. under the trademark UNI-PRIME ®. Identical sets of panels were prepared. One set was baked for 20 minutes at 250° F. (121° C.) and the other for 30 minutes at 250° F. (121° C.). Both sets of panels were first topcoated with a pigmented coating composition commerically available from PPG Industries, Inc. as HUBC-90270 and then topcoated with a clear coating composition also commercially available from PPG Industries, Inc. as DCT-3000. The panels which had been topcoated were then baked in a vertical position at 250° F. (121° C.) for 30 minutes. The panels were evaluated for chip resistance according to ASTM-D3170-74 with the exception that five pints of gravel were utilized instead of one pint. The chip resistance rating of the coated panel which was baked for 20 minutes at 250° F. prior to topcoating was 7. The chip resistance rating of the panel which was baked for 30 minutes at 250° F. prior to topcoating was 6.

EXAMPLE 8

This example illustrates the preparation of a coating composition according to the present invention utilizing the Michael adduct of Example 2, above.

| Ingredients | Parts by Weight (grams) |
| --- | --- |
| pigment paste of footnote[4] | 200.0 |
| acetophenone oxime blocked polyisocyanate of footnote[5] | 58.7 |
| Michael adduct of Example 2, above | 14.3 |
| BEETLE 80 | 2.0 |
| ultraviolet light stabilizer of footnote[7] | 8.0 |

The coating composition was prepared by combining the ingredients above with mild agitation. The coating composition had a resin solids content of 52.84 percent. The composition was applied and evaluated as has been detailed above in Example 7. The chip resistance ratings of the panel baked for 20 minutes at 250° F. prior to topcoating and the panel baked for 30 minutes at 250° F. prior to topcoating were both 6.

EXAMPLE 9

This example illustrates the preparation and evaluation of a coating composition utilizing the Michael adduct of Example 6, above.

| Ingredients | Parts by Weight (grams) |
| --- | --- |
| Michael adduct of Example 6 | 76.2 |
| dibutyltin dilaurate | 0.5 |

The coating composition was prepared by combining the ingredients together with mild agitation. The total solids content of the composition was 65.2 percent. The coating composition was drawn down on three different metal panels at a dry film thickness of 2 mils, 4.6 mils and 7 mils, respectively. All the panels were baked for 20 minutes at 250° F. (121° C.). The cured films were evaluated for pencil hardness and solvent resistance.

The pencil hardness was a measure of the resistance of the coating to a pencil indentor. The scale ranges from 4B which indicates a soft coating to 10H which indicates a hard coating:

4B, 3B, 2B, B, HB, F, H, 2H ... 10H

The solvent resistance was a measure of the resistance of the coating to back and forth rubs with a xylene soaked cloth. The results are shown below:

| Film Thickness | Pencil Hardness | Xylene Rubs |
| --- | --- | --- |
| 2 mils | 2H | greater than 200 |
| 4.6 mils | F | greater than 200 |
| 7 mils | 2B | greater than 200 |

The cured films exhibited excellent solvent resistance.

EXAMPLE 10

This example illustrates the preparation of a Michael adduct which is integral with crosslinking agent and its use in a coating composition.

| | Part A Ungelled Michael Adduct | |
| --- | --- | --- |
| Charge | Ingredients | Parts by Weight (grams) |
| I | toluene diisocyanate | 64.0 |
| II | acetophenone oxime of footnote[5] | 108.4 |
| III | Michael adduct of Example 5 | 627.0 |

A reactor vessel equipped with thermometer, addition funnel and nitrogen inlet tube was charged with (I) and (II) was added while cooling with a cold water bath. When the isocyanate was partially consumed as indicated by NCO equivalent weight determinations, the Charge (III) was added. When the remaining isocyanate was consumed the reaction product was poured out.

| Part B Coating Composition | |
| --- | --- |
| Ingredients | Parts by Weight (grams) |
| Integral Adduct of Part A | 72.2 |
| dibutyltin dilaurate | 0.5 |
| N—methyl pyrrolidone | 10.0 |

The coating composition had a total solids content of 60.5 percent. It was applied and evaluated as described in Example 9, above, except that different film thicknesses were applied. The results are shown below:

| Film Thickness | Pencil Hardness | Xylene Rubs |
| --- | --- | --- |
| 1.0 | 4B | 56 |
| 3.0 | less than 4B | became too gummy immediately |
| too soft to measure | less than 4B | became too gummy immediately |

It is believed that the softness of the films can be attributed to the presence of a large amount of very flexible polyurethane/polyether segments in the Michael adduct.

EXAMPLE 11

This example illustrates the preparation and evaluation of a coating composition using a mixture of Michael adducts.

| Ingredients | Parts by Weight (grams) |
|---|---|
| Michael adduct of Example 10 | 72.2 |
| Michael adduct of Example 6 | 76.2 |
| dibutyltin dilaurate | 1.0 |

The coating composition had a total solids content of 66.9 percent. It was applied and evaluated as described in Example 9, above, except that different film thicknesses were applied.

| Film Thickness | Pencil Hardness | Xylene Rubs |
|---|---|---|
| 1.2 mils | 2B | greater than 200 |
| 3.2 mils | 4B | greater than 200 |
| 9.0 mils | less than 4B | greater than 200 |

The cured films exhibited excellent solvent resistance.

COMPARATIVE EXAMPLE A

This example illustrates the preparation of a coating composition utilizing an amine polyol which contains secondary hydroxyl groups.

| Ingredients | Parts by Weight (grams) |
|---|---|
| amine polyol[8] | 27.8 |
| pigment paste[9] | 400.0 |
| blocked polyisocyanate[10] | 188.2 |

[8]This amine polyol containing secondary hydroxyl groups is commercially available from Air Products as DABCO ® CL-485 catalyst/crosslinker and is generically named N,N,N¹,N¹—tetrakis (2-hydroxypropyl) ethylene diamine.

[9]This pigment paste was prepared in the following manner:

| Ingredients | Parts by Weight (grams) |
|---|---|
| butyl acetate | 558.0 |
| butyl carbitol acetate | 354.6 |
| silica | 90.0 |
| blocked polyisocyanate[c] | 1500.0 |
| barium sulfate | 2400.0 |
| titanium dioxide | 504.0 |
| carbon black | 6.0 |

[c]This blocked polyisocyanate was prepared in the following manner:

| Charge | Ingredients | Parts by Weight (grams) |
|---|---|---|
| I | toluene diisocyanate | 870.0 |
|  | xylene | 300.5 |
|  | N—methyl pyrrolidone | 300.5 |
| II | TERATHANE 650 | 1520.0 |
|  | 1,4-butanediol | 15.0 |
| III | methylethyl ketoxime | 439.0 |
| IV | xylene | 55.0 |
|  | N—methyl pyrrolidone | 55.0 |

A reactor vessel equipped with thermometer, condenser, addition funnel and nitrogen inlet tube was charged with (I) at ambient temperature. While cooling with a cold water bath, (II) was added slowly over approximately one hour and 30 minutes and the reaction mixture was heated to 60° C. The reaction mixture was held at 60° C. for two hours and 30 minutes and then Charge (IV) was added. Charge (III) was added dropwise while cooling with a cold water bath over a period of approximately one hour and 30 minutes. The reaction was complete when infrared spectroscopic analysis indicated that the isocyanate was consumed. The resultant product had a total solids content of 75.6 percent determined at 110° C. for one hour.

For preparation of the paste, in a suitably equipped reactor vessel the first three ingredients listed above were stirred together with agitation. To this mixture were added with agitation the next 4 listed ingredients. The entire paste mixture was ground with zircoa beads to a Hegman grind of greater than 6.

[10]The blocked polyisocyanate is detailed in footnote (b), above.

The coating composition was prepared by combining the ingredients listed above with mild agitation. The coating composition had a resin solids content of 54.64 percent. The composition was spray applied onto steel panels which had been primed with a coating composition which is commercially available from PPG Industries, Inc. as UNI-PRIME ®. Panels were initially baked at 250° F. (121° C.) for 20 minutes UNI-PRIME ®. Panels were initially baked at 250° F. (121° C.) for 20 minutes however, the composition did not completely cure and remained as a tacky film. The coating composition required 30 minutes at 250° F. (121° C.) in order to cure. The cured film was evaluated for chip resistance according to ASTM-D 3170-74 with the exception that five pints of gravel were utilized instead of one pint. The film had a chip resistance rating of 8+.

COMPARATIVE EXAMPLE B

This example also illustrates the preparation of a coating composition utilizing an amine polyol which contains secondary hydroxyl groups. This example differs from Comparative Example A in that instead of using methyl ethyl ketoxime as the isocyanate blocking agent this example utilizes acetophenone oxime.

| Ingredients | Parts by Weight (grams) |
|---|---|
| amine polyol of footnote[8] | 10.3 |
| pigment paste of footnote[4] | 200.0 |
| BEETLE 80 | 2.0 |
| ultraviolet light stabilizer of footnote[7] | 8.0 |

The coating composition was prepared by combining the ingredients listed above with mild agitation. The composition had a resin solids content of 51.91 percent. The composition was applied and evaluated as set out in Example 7. The chip resistance rating of the panel which was baked for 20 minutes at 250° F. prior to topcoating was 7—. The chip resistance rating of the panel which was baked for 30 minutes at 250° F. prior to topcoating was 6.

What is claimed is:

1. A coating composition comprising:
    (A) an ungelled Michael adduct formed by reacting, under conditions sufficient to form a Michael adduct,
        (a) a material containing one or more primary and/or secondary amino groups and at least two hydroxyl groups; with
        (b) a material containing at least two alpha,beta-ethylenically unsaturated moieties; with the proviso that the rectants (a) and (b) are selected such that the resultant Michael adduct contains hydroxyl functionality; and
    (B) a curing agent adapted to crosslink with the hydroxyl functionality present on the Michael adduct; said adduct being stable under the curing conditions for the coating composition.

2. The coating composition of claim 1 wherein the material of (b) additionally contains one or more hydroxyl groups.

3. A coating composition comprising:

A. An ungelled Michael adduct formed by reacting, under conditions sufficient to form a Michael adduct,
   (a) a dialkanolamine; with
   (b) a material containing at least two alpha,beta-ethylenically unsaturated moieties; with the proviso that the reactants (a) and (b) are selected such that the resultant Micahel adduct contains hydroxyl functionality; and
B. a curing agent adatped to crosslink with the hydroxyl functionality present on the Michael adduct; said adduct being stable under the curing conditions for the coating composition.

4. The coating composition of claim 3 wherein (b) is a polyacrylate polymer.

5. The coating composition of claim 4 wherein the polyacrylate is a diacrylate.

6. The coating composition of claim 3 wherein the curing agent is a polyisocyanate.

7. A coating composition comprising:
A. an ungelled Michael adduct formed by reacting, under conditions sufficient to form a Michael adduct,
   (a) diethanolamine; with
   (b) 1,6-hexanediol diacrylate; and
B. a curing agent adapted to crosslink with the hydroxyl functionality present on the Michael adduct; said adduct being stable under the curing conditions for the coating composition.

8. The coating composition of claim 6 wherein the curing agent is a blocked polyisocyanate.

9. The coating composition of claim 8 wherein the blocked polyisocyanate is prepared from an aromatic polyisocyanate and acetophenone oxime as the blocking agent.

10. The coating composition of claim 9 wherein the polyisocyanate is an isocyanate prepolymer prepared from an aromatic polyisocyanate and an active hydrogen containing material.

11. The coating composition of claim 8 wherein the equivalent ratio of latent curing capped isocyanate groups to active hydrogens is at least 0.05:1.

12. The coating composition of claim 11 wherein the ratio ranges from 1.1:1.0 to 1.0:1.0.

13. The coating composition of claim 3 wherein the equivalent ratio of amine to unsaturated material ranges from about 1.5:1.0 to about 1.0:1.0.

14. The coating composition of claim 13 wherein the ratio ranges from 1.2:1.0 to 1.0:1.0.

15. A coating composition, comprising:
A. an ungelled Michael adduct formed by reacting, under conditions sufficient to form a Michael adduct,
   (a) a material containing one or more primary and/or secondary amino groups and at least two hydroxyl groups with
   (b) a material containing at least two vinyl groups; and
B. a curing agent adapted to crosslink with the hydroxyl groups present on the Michael adduct, the crosslinking reaction being catalyzed by the tertiary amine present on the Micahel adduct, said adduct being stable under the curing conditions for the coating composition.

* * * * *

UNITED STATES PATENT AND TRADEMARK OFFICE
CERTIFICATE OF CORRECTION

PATENT NO. : 4,786,682
DATED : November 22, 1988
INVENTOR(S) : Perez et al

It is certified that error appears in the above-identified patent and that said Letters Patent is hereby corrected as shown below:

Column 16, line 58, claim 1; "rectants" should read --reactants--.

Signed and Sealed this

Twenty-fifth Day of July, 1989

Attest:

DONALD J. QUIGG

Attesting Officer

Commissioner of Patents and Trademarks